(12) United States Patent
Miyauchi et al.

(10) Patent No.: US 7,568,592 B2
(45) Date of Patent: Aug. 4, 2009

(54) VEHICLE FUEL TANK

(75) Inventors: Kunio Miyauchi, Saitama (JP); Hideharu Suwa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 464 days.

(21) Appl. No.: 11/244,412

(22) Filed: Oct. 5, 2005

(65) Prior Publication Data
US 2006/0071003 A1    Apr. 6, 2006

(30) Foreign Application Priority Data
Oct. 6, 2004    (JP) .................... P2004-293997

(51) Int. Cl.
*B65D 6/00*    (2006.01)
(52) U.S. Cl. .................... 220/562; 220/4.14
(58) Field of Classification Search ............... 220/4.12, 220/4.13, 4.14, 563, 564, DIG. 12; 137/574
See application file for complete search history.

(56) References Cited

U.S. PATENT DOCUMENTS 3,129,014 A * 4/1964 Cyril et al. ............... 280/830
4,844,278 A 7/1989 Freiwald et al.
5,366,246 A * 11/1994 Chen et al. ............... 280/834
5,398,839 A * 3/1995 Kleyn .................... 220/560.03
5,850,933 A * 12/1998 Pazik .................... 220/563
6,044,999 A * 4/2000 Kido .................... 220/62.11
6,408,874 B1 6/2002 Keller

FOREIGN PATENT DOCUMENTS

| CN | 2490003 Y | | 5/2002 |
| JP | 57-32909 | | 7/1982 |
| JP | 58202112 A | * | 11/1983 |
| JP | 2-34443 | | 3/1990 |

* cited by examiner

*Primary Examiner*—Harry A Grosso
(74) *Attorney, Agent, or Firm*—Carrier, Blackman & Associates, P.C.; William D. Blackman; Joseph P. Carrier (57) ABSTRACT

A vehicle fuel tank made of a resin for storage of fuel is made by forming a substantially hexahedron by erecting left, right, front and rear wall surfaces from a bottom portion and connecting distal ends of the left, right, front and rear walls to an upper surface, wherein at least one of the suppressor walls extending longitudinally and perpendicularly is formed on at least one of the bottom portion and the upper surface for suppressing movement of the fuel.

6 Claims, 11 Drawing Sheets

FIG. 5A (COMPARATIVE EXAMPLE)

<==f2 changed to f1 inside tank

VEHICLE FUEL TANK

The present invention claims foreign priority to Japanese patent application no. P.2004-293997, filed on Oct. 6, 2004, the contents of which is incorporated herein by reference.

BACKGROUND OF THE INVENTION

1. Field of the Invention

The present invention relates to a vehicle fuel tank which is made of a resin and is configured to suppress a flowing noise that is generated when fuel is caused to flow abruptly and violently in association with acceleration or deceleration of a vehicle.

2. Description of the Background Art

As vehicle fuel tanks, resin fuel tanks which are made by making use of blow molding have been put to practical use.

Vehicle fuel tanks which are put to a practical use have been considered to be sufficient from the viewpoint of practical use as long as they are molded to sizes which can store predetermined volumes of fuel.

As vehicle fuel tanks of this kind, there have been known vehicle fuel tanks in which a suppressor wall (a wave canceling plate) is provided at the time of molding to prevent the flow of fuel within the tank when a vehicle is accelerated or decelerated (refer, for example, Japanese Utility Model Unexamined Publication JP-UM-A-2-34443, page 1, FIG. 1 and Japanese Utility Model Examined Publication JP-UM-B-57-32909, page 2, FIG. 1).

Figure 18:
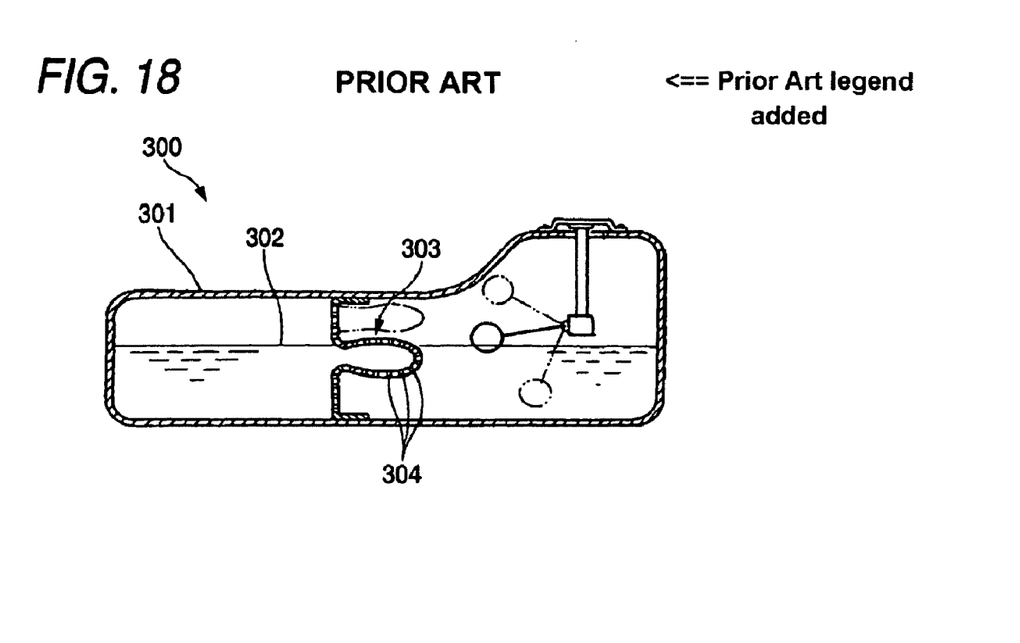
FIG. 18 is a drawing which explains a first basic configuration of the related art.

FIG. 18 is a drawing which describes a first basic configuration of the conventional fuel tanks and is actually a front sectional view of a vehicle fuel tank 300 in which a suppressor wall 303 is formed as a separate member.

The vehicle fuel tank 300 is such as to be made up of a tank main body 301 which stores fuel and a suppressor wall (a wave canceling plate) 303. The suppressor wall is provided within the tank main body 301 to suppress the abrupt and violent flow of fuel 302 which would otherwise occur in association with acceleration or deceleration of a vehicle. Pluralities of through holes 304 are formed in the suppressor wall 303 for allowing the passage of the fuel 302. The suppressor wall 303 is formed separately from the tank main body 301. Also, the suppressor wall 303 is inserted in the tank main body 301 when the tank main body 301 is blow molded and is welded to the tank main body 301 after the blow molding.

In the vehicle fuel tank 300, however, the suppressor wall 303 is such as to be made to intersect with the longitudinal direction of the vehicle at right angles, and hence there is caused a drawback that the suppressing effect is small relative to a planar flow (a circular current) of the fuel that occurs within the vehicle fuel tank 300 when the vehicle is stopped or started drastically.

Figure 19:
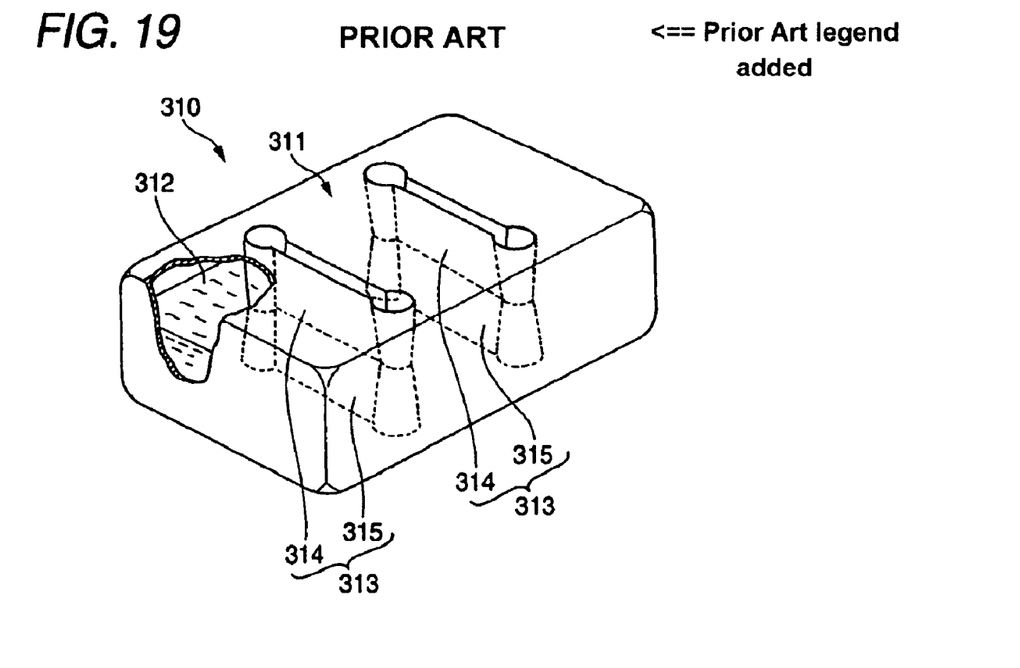
FIG. 19 is a drawing which explains a second basic configuration of the related art.

FIG. 19 is a drawing which describes a second basic configuration of the conventional fuel tanks and is actually a front sectional view of a vehicle fuel tank 310 in which suppressor walls 311 are formed separately.

The vehicle fuel tank 310 is such as to be made up of a tank main body 311 which stores fuel and suppressor walls (wave canceling plates) 313, 313 which are integrally provided within the tank main body 311. The suppressor walls 313 are formed integrally at two locations within the tank main body 311 by forming pairs of suppressor wall pieces 314, 315 from the top and bottom of the tank main body 311 at those two locations when the tank main body 311 is blow molded, so that an abrupt and violent flow of fuel 312 is suppressed which would otherwise occur in association with acceleration or deceleration of the vehicle.

In the vehicle fuel tank 310, however, as with the vehicle fuel tank 300 (refer to FIG. 13), the suppressor walls 313 are such as to be made to intersect with the longitudinal direction of the vehicle at right angles, and hence there is included a drawback that the suppressing effect is small relative to a planar flow (circular current) of the fuel that occurs within the vehicle fuel tank when the vehicle is stopped or started drastically.

Namely, a vehicle fuel tank is desired which can solve the drawback that the suppressing effect is small relative to the planar flow (circular current) of the fuel that occurs within the vehicle fuel tank when the vehicle is stopped or started drastically so as to provide a suppressing effect on the planar flow (circular current) of fuel.

SUMMARY OF THE INVENTION

With a view to solving the problem, according a first aspect of the invention, there is provided a vehicle fuel tank made of a resin for storage of fuel by forming a substantially hexahedron by erecting left, right, front and rear wall surfaces from a bottom portion and connecting distal ends of the left, right, front and rear walls to an upper surface, wherein at least one of suppressor walls extending longitudinally and perpendicularly is formed on at least one of the bottom portion and the upper surface for suppressing the movement of the fuel.

For example, it is preferable to achieve a suppressing effect against the planar flow (circular current) of fuel that is caused within the vehicle fuel tank when the vehicle is stopped or started drastically. Because a foreign noise, which is generated when the fuel so flowing collides against the front wall or the rear wall of the vehicle fuel tank, can be reduced.

Then, the suppressor wall extending longitudinally and perpendicularly for suppressing the movement of fuel is formed on at least one of the bottom portion and the upper surface.

Namely, the suppressor wall extending longitudinally and perpendicularly is formed on at least one of the bottom portion and the upper surface by for suppressing the movement of fuel, the suppressing effect is provided on the planar flow (circular current) of fuel within the vehicle fuel tank.

According to a second aspect of the invention, as set forth in the first aspect of the invention, it is preferable that the vehicle fuel tank further comprising:

a lower portion, of which a first height defined from the bottom portion of the fuel tank to an upper surface of the lower portion is lower than a second height defined from the bottom portion of the fuel tank to the upper surface of the fuel tank, formed on the bottom surface of the fuel tank, wherein the suppressor wall is formed on at least one of a bottom portion or an upper surface of the lower portion.

For example, when analyzing behavior of two circular currents at a location which provides a shorter height from the bottom portion to the upper surface of the vehicle fuel tank and; at a location which provides a taller height from the bottom portion to the upper surface of the vehicle fuel tank, the cross-sectional area of a flow path of fuel at the shorter height location can be considered to become smaller than that at the taller height location. Hence, the flow rate of the circular current at the shorter height location is increased compared with the taller height location.

Then, the planar flow (circular current) of fuel within the vehicle fuel tank is suppressed effectively by forming the suppressor wall on at least one of the bottom portion and the upper surface at the location where the height of the tank becomes shorter when compared with a case where the suppressor wall is formed at the location where the height of the tank becomes taller.

According to a third aspect of the present invention, as set forth in the first aspect of the present invention, it is preferable that the suppressor wall is provided on a center axis of a transverse direction of the fuel tank.

According to a fourth aspect of the present invention, as set forth in the first aspect of the present invention, it is preferable that the suppressor wall is secured to front wall.

According to a fifth aspect of the present invention, as set forth in the first aspect of the present invention, it is preferable that the suppressor wall is provided on a position shifted from a center axis of a transverse direction of the fuel tank.

According to a sixth aspect of the present invention, as set forth in the second aspect of the present invention, it is preferable that the lower portion is formed one side of the transverse direction of the fuel tank.

According to a seventh aspect of the present invention, as set forth in the sixth aspect of the present invention, it is preferable that the lower portion is formed one side of the longitudinal direction of the fuel tank.

According to the first aspect of the invention, since the suppressor wall extending longitudinally and perpendicularly is formed on at least one of the bottom portion and the upper surface so as to suppressing the movement of the fuel, the suppressing effect can be provided on the planar flow (circular current) of fuel within the vehicle fuel tank. As a result of this, there is provided an advantage that a foreign noise can be reduced which is generated due to the fuel colliding against the front wall or the rear wall of the vehicle fuel tank.

According to the second aspect of the invention, since the suppressor wall is formed on at least one of the bottom portion and the upper surface at the location where the height of the tank becomes shorter, the planar flow (circular current) of fuel within the vehicle fuel tank can be suppressed effectively when compared with the case where the suppressor wall is formed at the location where the height of the tank becomes taller. As a result, there is provided an advantage that the foreign noise can be reduced further which is generated due to the fuel colliding against the front wall or the rear wall of the vehicle fuel tank.

DETAILED DESCRIPTION OF THE PREFERRED EMBODIMENTS

A best mode for carrying out the invention will be described based on the accompanying drawings. Note that the drawings are to be seen in such a direction that reference numerals given therein stand properly.

Figure 1:
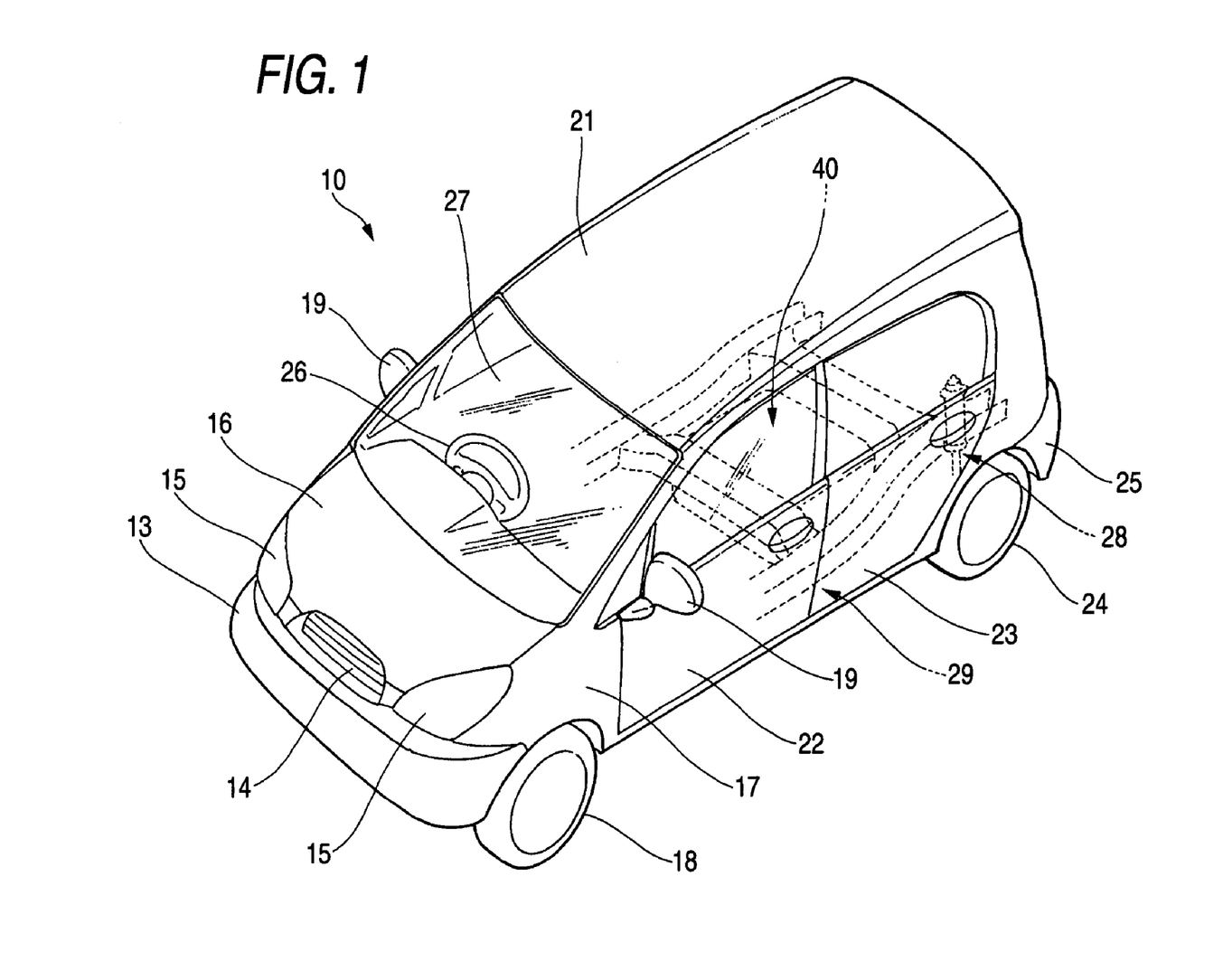
FIG. 1 is a perspective view of a vehicle which adopts a vehicle fuel tank of a first embodiment according to the invention.

FIG. 1 is a perspective view of a vehicle to which a vehicle fuel tank according to a first embodiment of the invention is applied. Reference numeral 10 denotes a vehicle, 13 denoting a front bumper, 14 a front grille, 15 a headlamp, 16 a bonnet, 17 a front fender, 18 a front wheel, 19 an outside rearview mirror, 21 a roof, 22 a front side door, 23 a rear side door, 24 a rear wheel, 25 a rear bumper, 26 a steering wheel, 27 a windscreen, 28 a rear suspension, and 29 a chassis frame.

A vehicle fuel tank 40 (hereinafter, simply referred to as a fuel tank 40) is, as will be described later, a tank that realizes the suppression of a foreign noise (an oscillating noise or a flowing noise) that is generated by fuel that is caused to flow within the tank in association with acceleration or deceleration of a vehicle.

Figure 2:
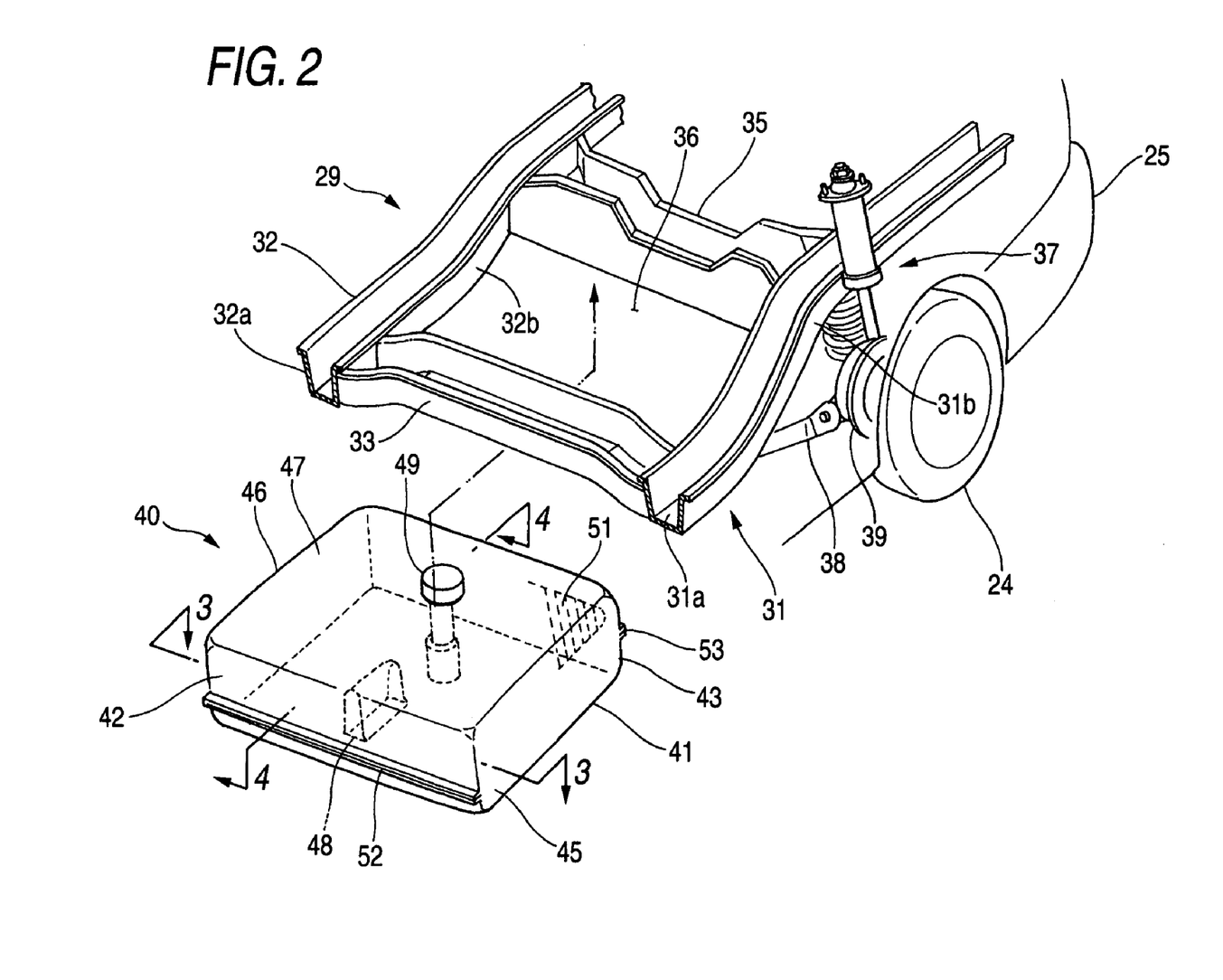
FIG. 2 is an exploded perspective view of the vehicle fuel tank of the first embodiment according to the invention and a chassis frame to which the vehicle fuel tank is attached.

FIG. 2 is an exploded view of a vehicle fuel tank of a first embodiment according to the invention. A chassis frame 29 has left and right rear side frames 31, 32. A front cross member 33 bridges front end portions 31a, 32a of the left and right rear side frames 31, 32. A rear cross member 35 bridges substantially central portions 31b, 32b of the left and right rear side frames 31, 32 (to be specific, in the vicinity of rear wheels 24). These left and right rear side frames 31, 32 and the front and rear cross members 33, 35 form a substantially rectangular space 36, when viewed from the top. In the space 36, the fuel tank 40 is disposed. (Left and right is defined according to a driver's view point)

The left rear side frame 31 is a member which is formed into a shape with a substantially U-shaped cross section and which extends from a front to a rear of the chassis. Note that a left rear axle (not shown) is attached to the left rear side frame 31 via a link unit 38 of a left rear suspension 37. A left brake disc 39 and the left rear wheel 24 are attached to this left rear axle. (Left and right is defined according to the driver's view point)

The right rear side frame 32 is a member which is disposed in parallel with the left rear side frame 31 with a predetermined space provided therebetween. As with the left rear side frame 31, the right rear side frame 32 is a member which is formed into a shape with a substantially U-shaped cross section and which extends from the front to the rear of the chassis. Note that as with the left rear side frame 31, a right rear suspension (not shown) having the same configuration as that of the left rear suspension 37 is attached to the right rear side frame 32.

The fuel tank 40 according to the first embodiment is a tank which is made of a resin and which exhibits a substantially hexahedral shape. The tank 40 is a flat, substantially hexahedral construction, and is made up of a substantially rectangular bottom portion 41, a front wall 42 and a rear wall 43 which are erected from the bottom portion 41, a left wall surface 45 and a right wall surface 46 which are erected from the bottom portion 41 and a substantially rectangular upper surface 47 which connects together distal ends of the front wall 42, rear wall 43, left wall surface 45 and right wall surface 46. Further, the tank 40 is provided with a suppression wall (a wave canceling plate) 48 formed on the bottom portion 41 for suppressing a planar flow (circular current) of a fuel 51 within the fuel tank 40. A fuel pump (a pump module) 49 for supplying fuel for an engine (not shown) is provided back of the suppression wall 48. Note that reference numeral 51 denotes fuel.

Furthermore, the fuel tank 40 is a tank that is formed of a resin through blow molding, and the suppression wall 48 is formed integrally on the bottom portion 41 at the time of blow molding. Front and rear pinch-offs 52, 53 are provided on the front and rear walls 42, 43, respectively.

Note that the front and rear pinch-offs 52, 53 mean locations that are generated by pinching off both end portions of a cylindrical parison which is an original material by molds when blow molding the fuel tank 40.

Figure 3:
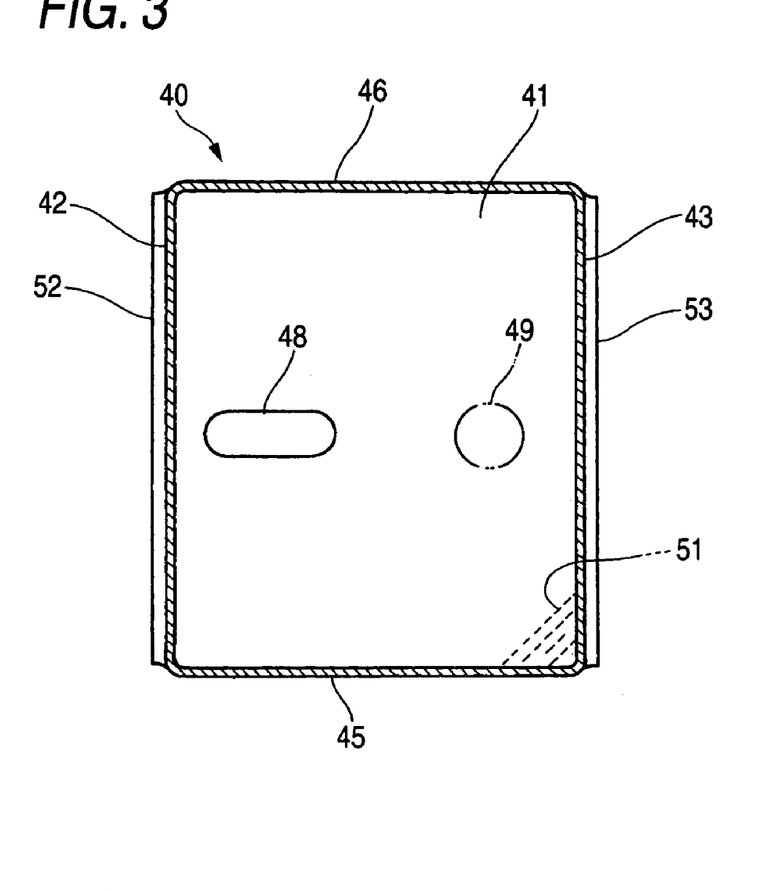
FIG. 3 is a sectional view taken along the line 3-3 in FIG. 2.

FIG. 3 is a sectional view taken along the line 3-3 in FIG. 2 and shows a sectional plan view of the fuel tank 40 of the first embodiment. It can be said that the fuel tank 40 is a vehicle fuel tank made of a resin for storage of a fuel 51 by forming a substantially hexahedron by erecting the left and right wall surfaces 45, 46 as well as the front and rear walls 42, 43 from the bottom portion 41 and connecting the distal ends of the left and right wall surfaces 45, 46 as well as the distal ends of the front and rear walls 42, 43 to the upper surface 47, wherein the suppressor wall (the wave canceling plate) 48 is formed on at least one of the bottom portion 41 and the upper surface 47 which suppresses the movement of the fuel 51 by being extended longitudinally and perpendicularly.

Note that the suppressor wall 48 and the fuel pump 49 are disposed at a center between the left and right wall surfaces 45, 46 and are disposed in that order from the front wall 42.

For example, in case the suppressing effect can be provided on the planar flow (circular current) of fuel that is generated within the vehicle fuel tank when the vehicle is stopped or started abruptly and violently, it is preferable since a foreign noise can be reduced that is generated when the fuel so flowing collides against the front wall or the rear wall of the vehicle fuel tank, and hence in the fuel tank 40, the suppressor wall 48 for suppressing the movement of the fuel 51 is formed on the bottom portion 41 by being extended longitudinally and perpendicularly.

Figure 4:
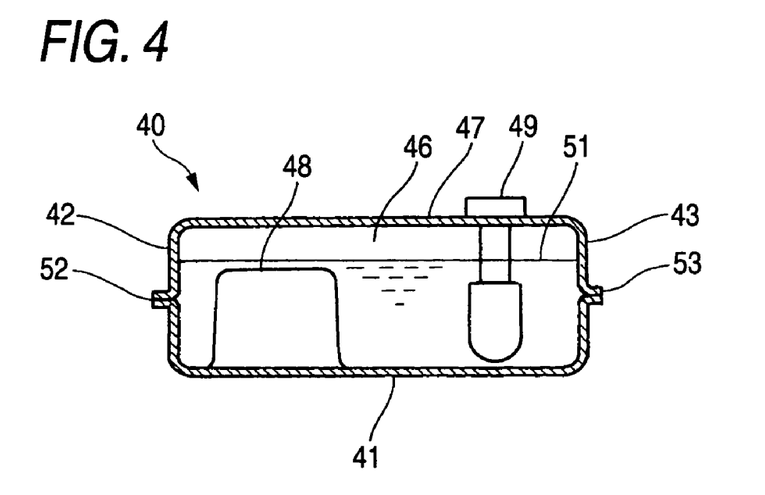
FIG. 4 is a sectional view taken along the line 4-4 in FIG. 2.

FIG. 4 is a sectional view taken along the line 4-4 in FIG. 2 and shows a sectional side view of the fuel tank 40. The suppressor wall 48 for suppressing the movement of the fuel 51 is formed on the bottom portion 41 by being extended longitudinally and perpendicularly, whereby the suppressing effect can be provided on the planar flow (circular current) of the fuel within the fuel tank 40. As a result of this, the foreign noise can be reduced which is generated when the fuel so flowing collides against the front wall 42 or the rear wall 43 of the fuel tank 40.

Note that when assuming that the height of the fuel tank is H1 and the height of the suppressor wall is H2, in case the height H2 of the suppressor wall is set to 60% or greater of the height H1 of the fuel tank (to a height which exceeds 60% of the height H1 of the fuel tank), a sufficient suppressing effect can be obtained on the planar flow (circular current) of fuel.

Figure 5A:
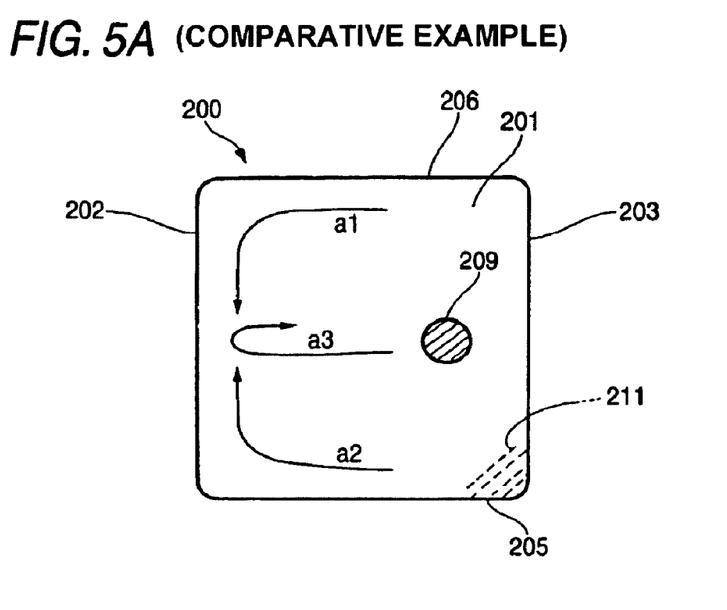
FIGS. 5A and 5B are function explanatory drawings which show flows (circular currents) of fuel in the vehicle fuel tank according to the invention.
Figure 5B:
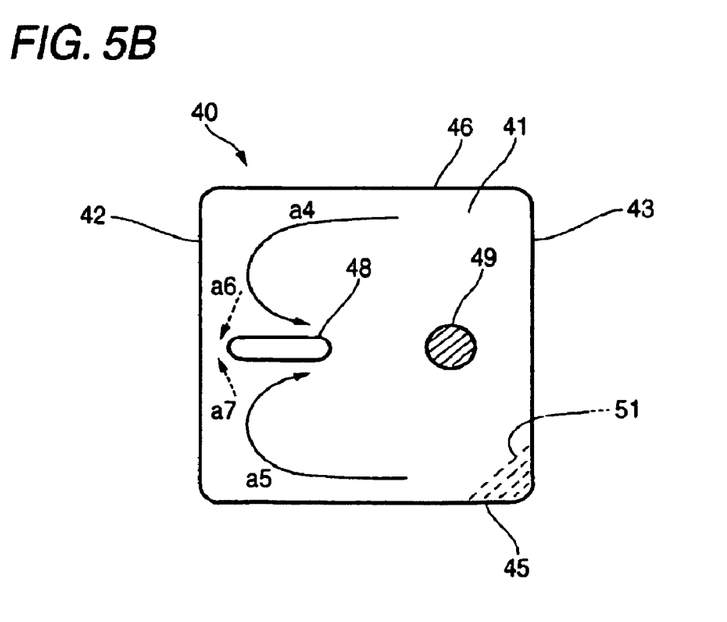

FIGS. 5A, 5B are function explanatory drawings which show flows (circular currents) of fuel within the vehicle fuel tank according to the invention. Note that FIG. 5A shows a vehicle fuel tank 200 (hereinafter, simply referred to as a fuel tank 200) of a comparison example. FIG. 5B shows the fuel tank 40 of the embodiment.

In FIG. 5A, the fuel tank 200 is a tank which is made of a resin and which exhibits a substantially hexahedral shape. The tank 200 is a tank which has a flat, substantially hexahedral construction and which is made up of a substantially rectangular bottom portion 201, a front wall 202 and a rear wall 203 which are erected from the bottom portion 201, a left wall surface 205 and a right wall surface 206 which are erected from the bottom portion 201, and a substantially rectangular upper surface (not shown) which connects together distal ends of the front wall 202, rear wall 203, left wall surface 205 and right wall surface 206. Note that reference numeral 209 denotes a fuel pump and reference numeral 211 denotes a fuel.

In the fuel tank 200, when a vehicle (not shown) is accelerated or decelerated, planar flows (circular currents) of the fuel 211 are generated as indicated by arrows a1 to a3, and since these flows of the fuel are made to remain as they are, the flow (circular current) of the fuel cannot be attenuated within a short period of time. Namely, the suppressing effect on the flow (circular current) is poor and hence a foreign noise is sometimes generated which is generated when the fuel collides against the front wall 202 or the rear wall of the fuel tank 200.

In FIG. 5B, in the fuel tank 40, in the event that planar flows (circular currents) of the fuel 51 are generated as indicated by arrows a4, a5 when the vehicle 10 (refer to FIG. 1) is accelerated or decelerated, the circular current of the fuel so generated can be stopped to be attenuated. As a result of this, the foreign noise (the flowing noise) which is generated by virtue of the collision of the fuel against the front wall 42 or the rear wall 43 of the fuel tank 40 can be prevented. Note that arrows a6, a7 denote flows which branch off the circular currents indicated by the arrows a4, a5, respectively.

Figure 6:
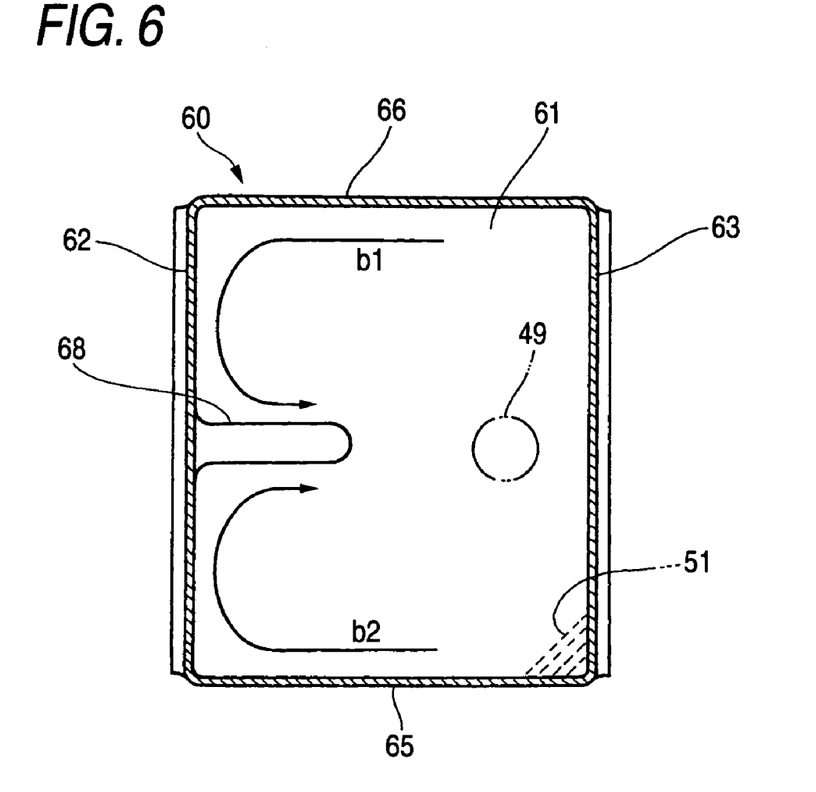
FIG. 6 is a sectional plan view of a vehicle fuel tank of a second embodiment according to the invention.
Figure 7:
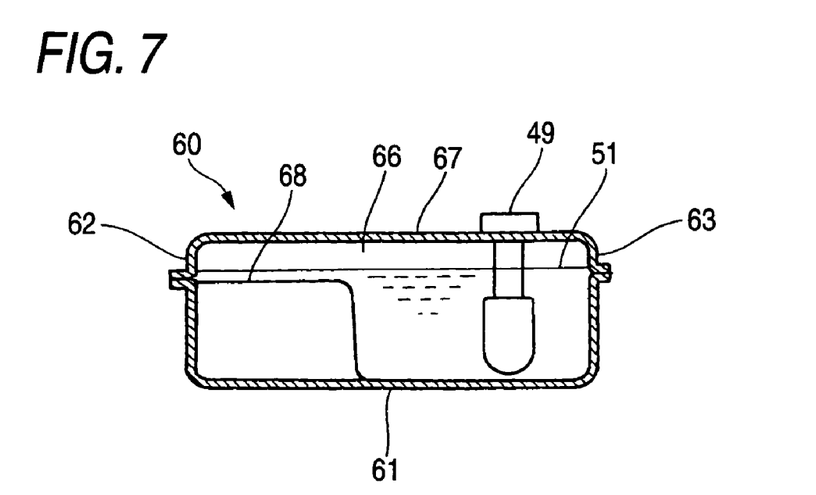
FIG. 7 is a sectional side view of the vehicle fuel tank of the second embodiment according to the invention.

FIG. 6 is a sectional plan view of a vehicle fuel tank of a second embodiment according to the invention. FIG. 7 is a sectional side view of the vehicle fuel tank of the second embodiment according to the invention. Note that like reference numerals to those used in the fuel tank 40 (refer to FIG. 2) of the first embodiment are given to like components to those used in the fuel tank 40, and the detailed description thereof will be omitted.

A vehicle fuel tank 60 (hereinafter, simply referred to as a fuel tank 60) of the second embodiment is such that a suppression wall (a wave canceling plate) for suppressing the movement of a fuel 51 is formed on a bottom portion 61 by being extended longitudinally and perpendicularly and that the suppression wall 68 is closely secured to a front wall 62.

In the figures, reference numeral 49 denotes a fuel pump, 63 denoting a rear wall, 65 a left wall surface, 66 a right wall surface and 67 an upper surface (refer to FIG. 7).

Note that the suppression wall 68 and the fuel pump 49 are disposed at a center between the left and right wall surfaces 65, 66 and are disposed such that from the front wall 62, the suppression wall 68 and the fuel pump in this order.

In the fuel tank 60, since the suppression wall 68 is closely secured to the front wall 62, in the event that planar flows (circular currents) of the fuel 51 are generated as indicated by arrows b1, b2 when the vehicle 10 (refer to FIG. 1) is accelerated or decelerated, the branch flows indicated by the arrows a6, a7 in FIG. 5 can be suppressed.

Figure 8:
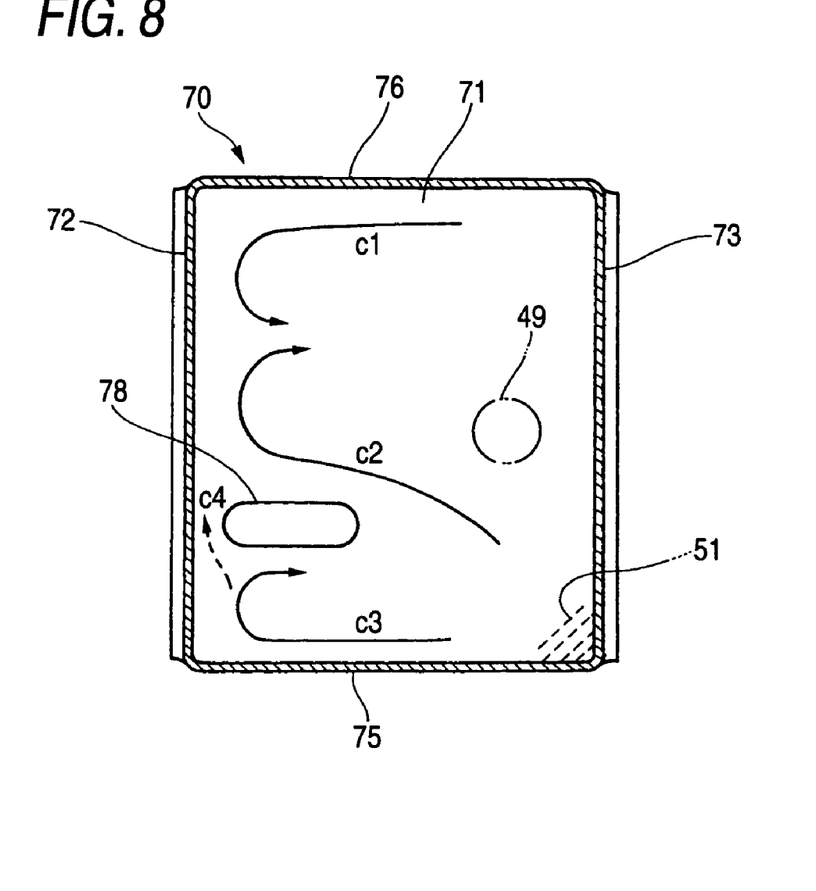
FIG. 8 is a sectional plan view of a vehicle fuel tank of a third embodiment according to the invention.
Figure 9:
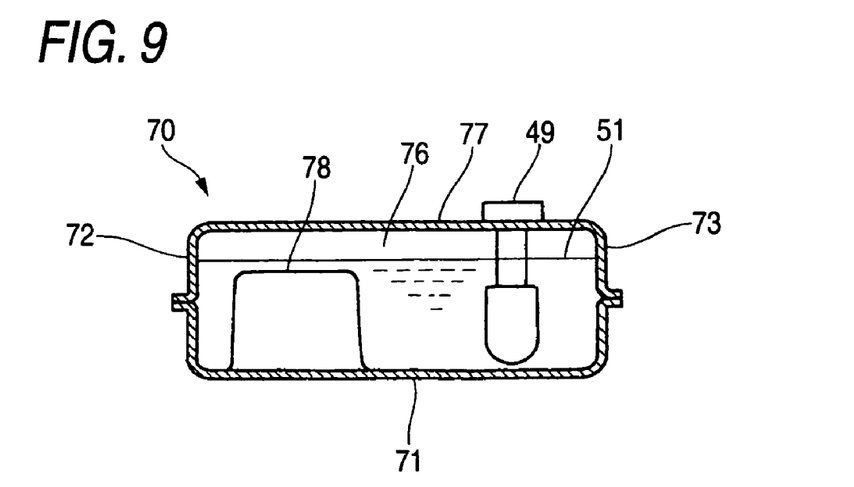
FIG. 9 is a sectional side view of the vehicle fuel tank of the third embodiment according to the invention.

FIG. 8 is a sectional plan view of a vehicle fuel tank of a third embodiment according to the invention. FIG. 9 is a sectional side view of the vehicle fuel tank of the third embodiment according to the invention. Note that like reference numerals to those used in the fuel tank 40 (refer to FIG. 2) of the first embodiment are given to like components to those used in the fuel tank 40, and the detailed description thereof will be omitted.

A vehicle fuel tank 70 (hereinafter, simply referred to as a fuel tank 70) of the third embodiment is such that a fuel pump 49 is disposed at the center of left and right wall surfaces 75, 76 and a suppression wall (a wave canceling plate) 78 for suppressing the movement of a fuel 51 is formed by being extended longitudinally and perpendicularly in such a manner as to deviate from the fuel pump 49 in a transverse direction. In addition, the fuel tank 70 is such that the suppressor wall 78 and the fuel pump 49 are disposed in that order from a front wall 72. Reference numeral 77 shown in FIG. 9 denotes an upper surface.

In the fuel tank 70, since the fuel pump 49 is disposed at the center of the left and right wall surfaces 75, 76 and the suppressor wall 78 is formed in such a manner as to deviate from the fuel pump 49 in the transverse direction, a planar flow (circular current) of the fuel 51 that is generated when the vehicle 10 (refer to FIG. 1) is accelerated or decelerated can be divided into planar flows (circular currents) of the fuel 51 indicated by arrows c1, c2 and c3. Consequently, the generation of a large flow (circular current) of the fuel can be prevented, and hence a foreign noise that is generated when the fuel collides against the front wall 72 or the rear wall 73 of the fuel tank 70 can be reduced. Note that an arrow c4 indicates a flow which branches off the flow (circular current) of the fuel indicated by the arrow c3.

Figure 10:
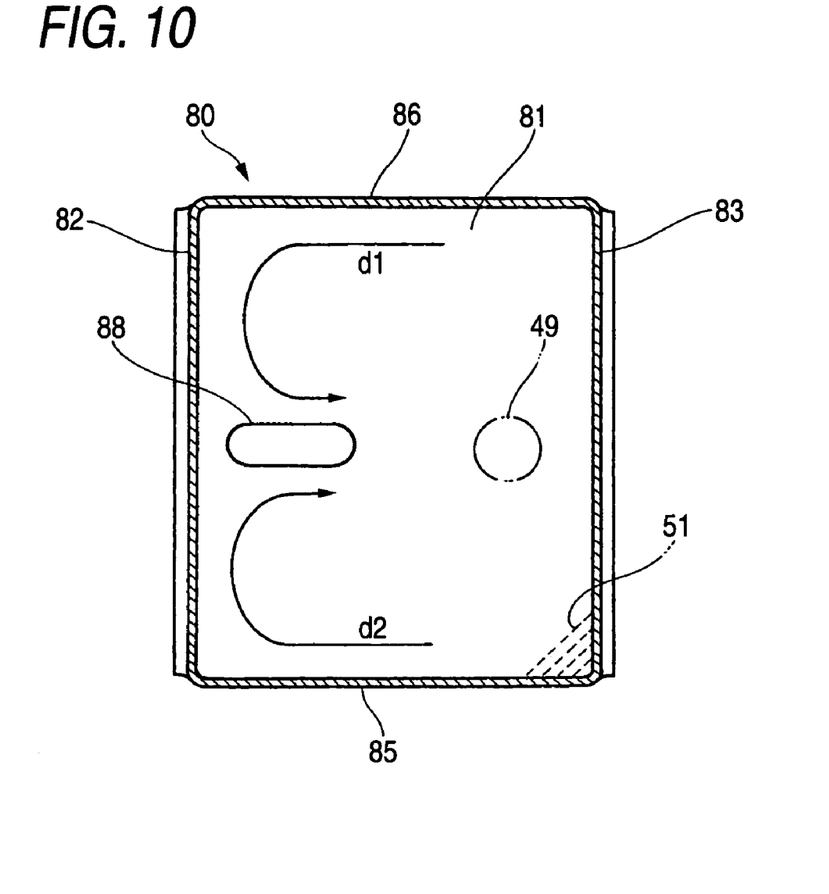
FIG. 10 is a sectional plan view of a vehicle fuel tank of a fourth embodiment according to the invention.
Figure 11:
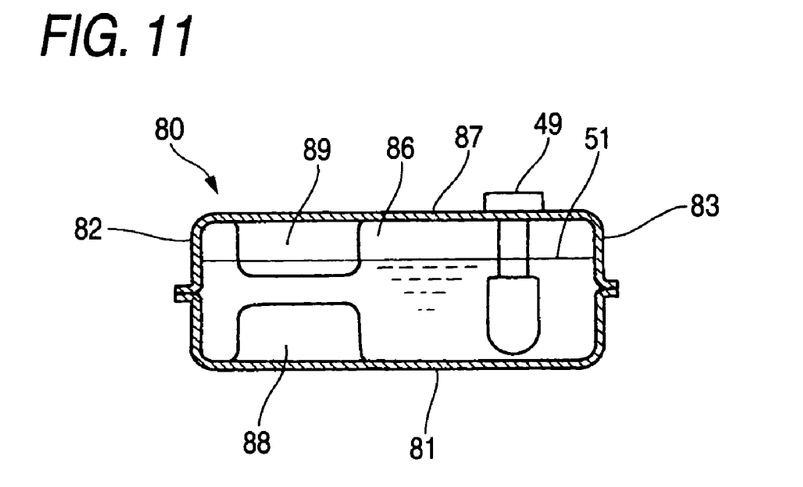
FIG. 11 is a sectional side view of the vehicle fuel tank of the fourth embodiment according to the invention.

FIG. 10 is a sectional plan view of a vehicle fuel tank of a fourth embodiment according to the invention. and FIG. 11 is a sectional side view of the vehicle fuel tank of the fourth embodiment according to the invention. Note that like reference numerals to those used in the fuel tank 40 (refer to FIG. 2) of the first embodiment are given to like components to those used in the fuel tank 40, and the detailed description thereof will be omitted.

A vehicle fuel tank 80 (hereinafter, simply referred to as a fuel tank 80) of the fourth embodiment is such that a suppressor wall (a wave canceling plate) 88 for suppressing the movement of a fuel 51 is formed on a bottom portion 81 by being extended longitudinally and perpendicularly and a suppressor plate (a wave canceling plate) 89 (refer to FIG. 11) for suppressing the movement of the fuel 51 is formed on an upper surface 87 (refer to FIG. 11) by being extended longitudinally and perpendicularly. In the figures, reference numeral 82 denotes a front wall, 83 denoting a rear wall, 85 a side wall surface and 86 a right wall surface.

Note that the suppressor walls 88, suppressor plate 89 and a fuel pump 49 are disposed at the center of the left and right wall surfaces 85, 86. Also, the suppressor walls 88, 89 and the fuel pump 49 are disposed in that order from the front wall 82.

In the fuel tank 80, since the suppressor wall 88 for suppressing the movement of the fuel 51 is formed on the bottom portion 81 and the suppressor plate 89 for suppressing the movement of the fuel 51 is formed on the upper surface 87 (refer to FIG. 11), planar flows (circular currents) of the fuel 51 that are generated as indicated by arrows d1, d2 when a large volume of fuel 51 is stored in the fuel tank 80 can be attenuated by the suppressor walls 88,and suppressor plate 89 (as to 89, refer to FIG. 11).

Figure 12:
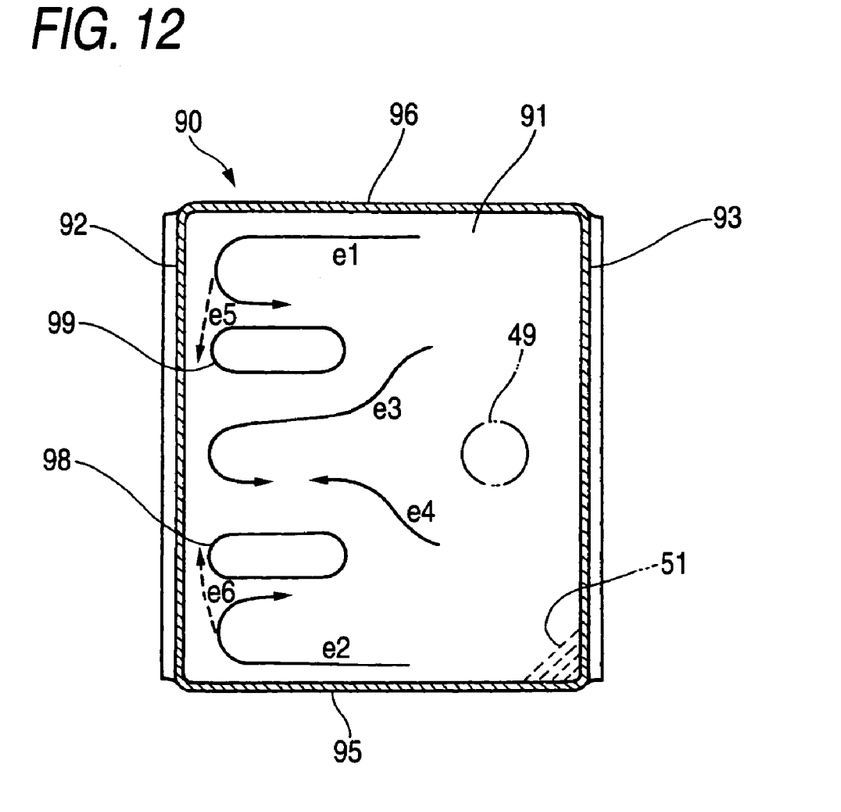
FIG. 12 is a sectional plan view of a vehicle fuel tank of a fifth embodiment according to the invention.
Figure 13:
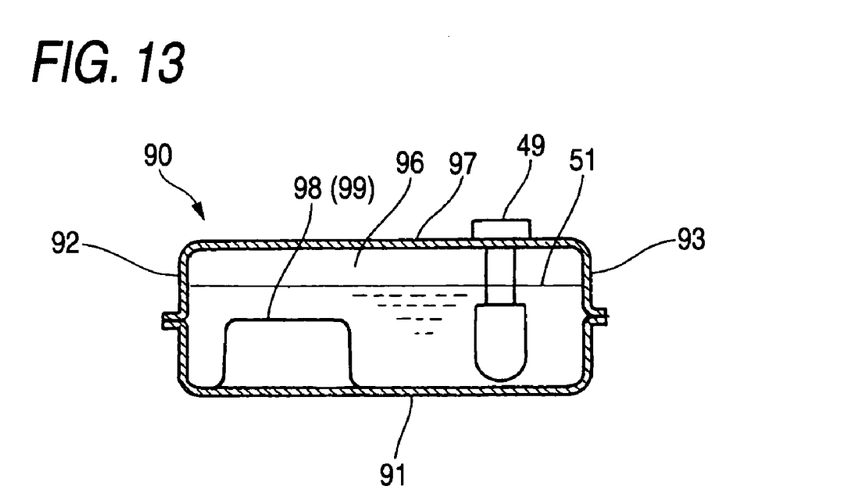
FIG. 13 is a sectional side view of the vehicle fuel tank of the fifth embodiment according to the invention.

FIG. 12 is a sectional plan view of a vehicle fuel tank of a fifth embodiment according to the invention. FIG. 13 is a sectional side view of the vehicle fuel tank of the fifth embodiment according to the invention. Note that like reference numerals to those used in the fuel tank 40 (refer to FIG. 2) of the first embodiment are given to like components to those used in the fuel tank 40, and the detailed description thereof will be omitted.

A vehicle fuel tank 90 (hereinafter, simply referred to as a fuel tank 90) of the fifth embodiment is such that suppressor walls (wave canceling plates) 98, 99 for suppressing the movement of a fuel are formed on a bottom portion 91 by being elongated longitudinally and perpendicularly. In the figures, reference numeral 92 denotes a front wall, 93 denoting a rear wall, 95 a left wall surface, 96 a right wall surface and 97 an upper surface.

Note that the fuel pump 49 is disposed at a center between the left and right wall surfaces 95, 96. The suppressor walls 98, 99 and the fuel pump 49 are disposed in that order from the front wall 92.

In the fuel tank 90, since the left and right suppressor walls 98, 99 for suppressing the movement of the fuel 51 are formed on the bottom portion 91, a planar flow (circular current) of the fuel 51 can be divided into small planner flows (circular currents) as indicated by arrows e1 to e4 in FIG. 12. As a result of this, the flows (circular currents) of the fuel can be attenuated. Note that e5 and e6 denote flows which branch off the flows (circular currents) indicated by the arrows e1, e2, respectively.

Figure 14:
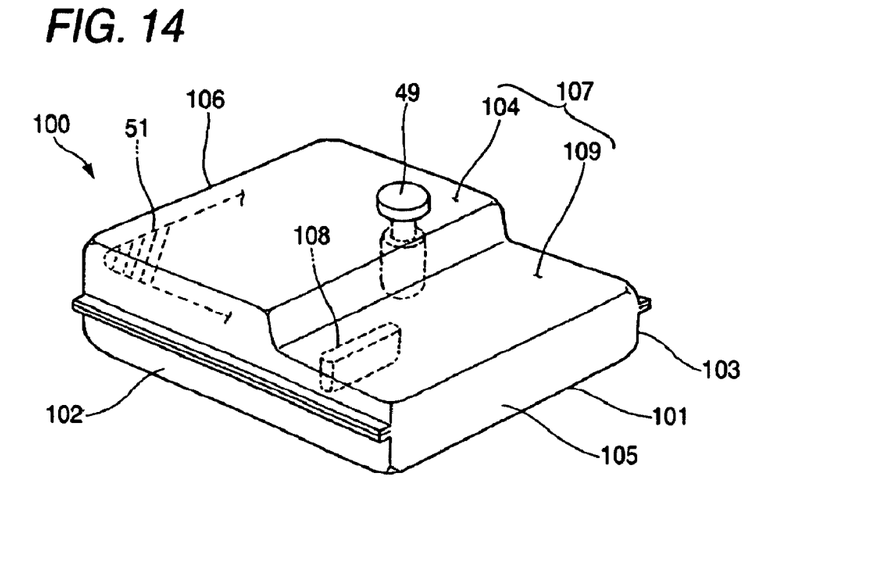
FIG. 14 is a perspective view of a vehicle fuel tank of a sixth embodiment according to the invention.

FIG. 14 is a perspective view of a vehicle fuel tank of a sixth embodiment according to the invention. A vehicle fuel tank 100 (hereinafter, simply referred to as a fuel tank 100) is a tank which is made of a resin and which has a substantially hexahedral shape and a stepped-down portion in a transverse direction. The tank 100 has a flat, substantially hexahedral construction and is made up of a substantially rectangular bottom portion 101, a front wall 102 and a rear wall 103 which are erected from the bottom portion 101, a left wall surface 105 and a right wall surface 106 which are erected from the bottom portion 101 and a substantially rectangular upper surface 107 which connects together distal ends of the front wall 102, rear wall 103, left wall surface 105 and right wall surface 106. A suppression wall (a wave canceling plate) 108 is formed on the bottom portion 101 for suppressing a planar flow (circular current) of a fuel 51 within the fuel tank 100 and a fuel pump (a pomp module) 49 for supplying fuel for an engine (not shown) is provided back of the suppression wall 108.

Furthermore, the fuel tank 100 is such that a stepped-down portion (a lower portion) 109 is formed on the upper surface 107 as a location where the height of the tank becomes shorter by setting the height of the tank lower by a step at a transversely right-hand side portion (when looking at FIG. 14 as shown). The suppressor wall 108 for suppressing the movement of the fuel 51 is formed on the bottom portion 101 at a side thereof which faces the stepped-down portion 109. Namely, it can be said that the fuel tank 100 is such that in the event that there exists a location which provides a different height from the bottom portion 101 to the upper surface 107, the suppressor wall 108 is formed on the bottom portion of the location 109 which is shorter in height. Note that reference numeral 51 denotes a fuel and reference numeral 104 denotes a location which is taller in height (a higher portion).

Figure 15:
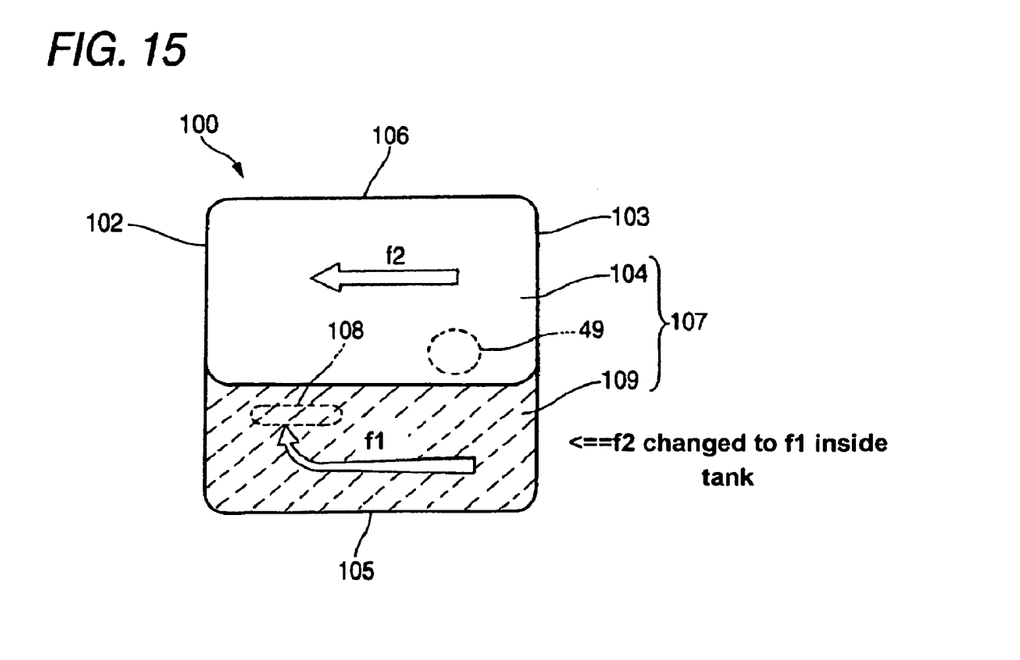
FIG. 15 is a function explanatory drawing of the vehicle fuel tank of the sixth embodiment according to the invention.

FIG. 15 is an explanatory drawing which explains the function of the vehicle fuel tank of the sixth embodiment according to the invention. For example, when observing a change in circular current at the location 109 which provides the shorter height from the bottom portion 101 to the upper surface 107 of the fuel tank 100 and at the location 104 which provides the taller height from the bottom portion 101 to the upper surface 107 of the fuel tank 100. The cross-sectional area of a flow path of fuel at the shorter height location 109 can be considered to become smaller than that at the taller height location 104, and hence the flow rate of the circular current at the shorter height location 109 is increased compared with the taller height location 104.

Consequently, the flow rate of a circular current, which is indicated by an arrow f1, at the shorter height location 109 can be said to be faster than the flow rate of a circular current, which is indicated by an arrow f2, at the taller height location 104.

Then, by forming the suppressor wall 108 on the bottom portion 101 (refer to FIG. 14) at the location 109 where the height of the tank becomes shorter, the planar flow (circular current) of the fuel 51 (refer to FIG. 14) within the fuel tank 100 can be suppressed effectively compared with a case where the suppressor wall 108 is formed at the taller height location 104. As a result of this, the foreign noise that is generated when the fuel collides against the front wall 102 or the rear wall 103 of the fuel tank 100 can be reduced further.

Figure 16:
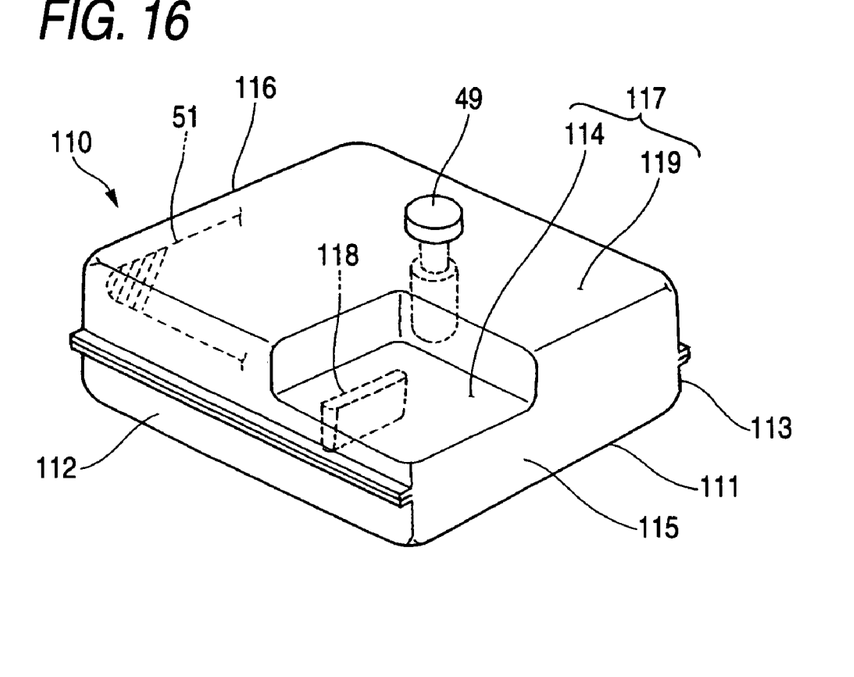
FIG. 16 is a perspective view of a vehicle fuel tank of a seventh embodiment according to the invention.

FIG. 16 is a perspective view of a vehicle fuel tank of a seventh embodiment according to the invention, and in the figure, reference numeral 110 denotes a vehicle fuel tank (a fuel tank), 111 denoting a bottom portion, 112 a front wall, 113 a rear wall, 114 a location where the height of the tank becomes tall (a higher portion), 115 a left wall surface, 116 a right wall surface, 117 an upper surface, 118 a suppressor wall (a wave canceling plate) and 119 a stepped-down portion (a lower portion) as a location where the height of the tank becomes shorter.

Namely, the fuel tank 110 is such that the stepped-down portion 119 where the height of the fuel tank 100 is set shorter by a step is formed on the upper surface 117 at a right front portion thereof and that the suppressor portion 118 for suppressing the movement of a fuel 51 is formed on the bottom portion 111 at a side thereof which faces the stepped-down portion 119 by being extended longitudinally and perpendicularly.

Figure 17:
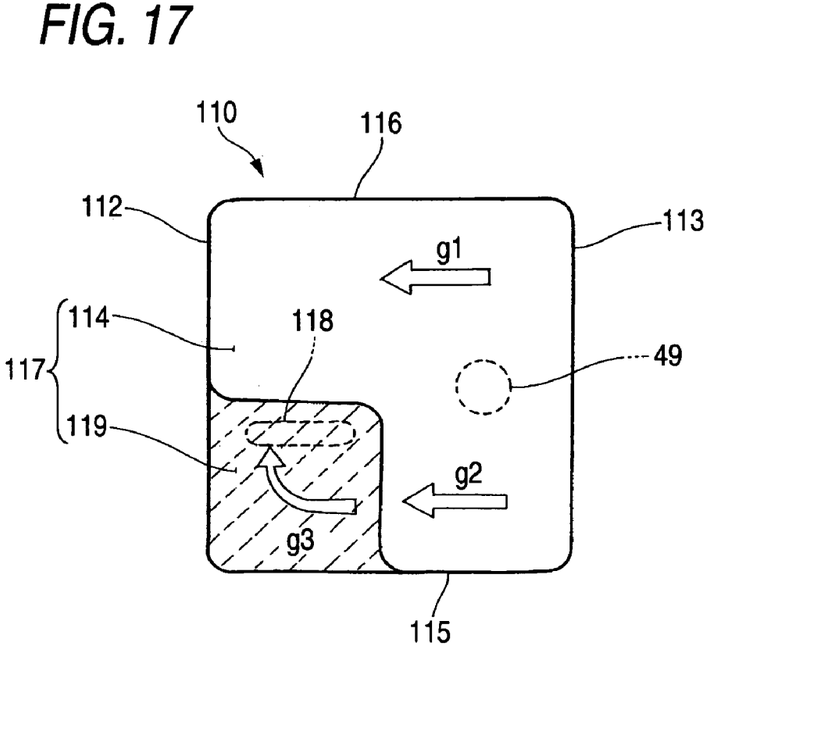
FIG. 17 is a function explanatory drawing of the vehicle fuel tank of the seventh embodiment according to the invention.

FIG. 17 is an explanatory drawing which explains the function of the vehicle fuel tank of the seventh embodiment according to the invention. It is considered that of flows (circular currents) of fuel that are generated at a constant velocity within the fuel tank 110 as indicated by arrows g1, g2, the flow (circular current) of fuel indicated by the arrow g2 increases its velocity at the stepped-down portion (lower portion) 119 like a flow (circular current) of fuel as indicated by an arrow g3. Consequently, the planar flow (circular current) of the fuel 51 (refer to FIG. 16) within the fuel tank 110 can be suppressed effectively by forming the suppressor wall 118 on the bottom portion 111 at the location 119 where the height of the tank becomes shorter.

Note that in the vehicle fuel tank of the first embodiment according to the invention, the suppressor wall 48 for suppressing the movement of the fuel 51 is, as shown in FIG. 4, formed on the bottom portion 41, the invention is not limited thereto, and hence the vehicle fuel tank may be such that the suppressor wall 48 may be formed on the upper surface.

Note that in the vehicle fuel tank of the sixth embodiment according to the invention, the suppressor wall 108 for suppressing the movement of the fuel 51 is, as shown in FIG. 14, formed on the bottom portion 101, the invention is not limited thereto, and hence the vehicle fuel tank may be such that the suppressor wall 108 may be formed on the upper surface.

The vehicle fuel tank according to the invention is preferable for application to passenger cars (vehicles) such as sedans and station wagons which are required to ensure the quietness in the passenger compartment.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A vehicle fuel tank made of a resin for storage of fuel, said fuel tank being formed substantially in the shape of a hexahedron by erecting left, right, front and rear wall surfaces from a bottom portion and connecting distal ends of the left, right, front and rear walls to an upper surface panel, said tank having a longitudinal tank axis extending between central portions of the front and rear wall surfaces, and configured to be installed in a vehicle with the longitudinal tank axis oriented substantially parallel to a longitudinal axis of the vehicle, wherein at least one suppressor wall, extending longitudinally in said tank and perpendicularly to said front wall surface, is integrally formed on at least one of the bottom portion and the upper surface panel for suppressing movement of the fuel in the fuel tank, and wherein the suppressor wall is secured to the front wall, wherein a rear edge portion of said suppressor wall is disposed forward of a central portion of said tank, such that a central portion of the tank is open and unobstructed.

2. The vehicle fuel tank as set forth in claim 1, wherein the suppressor wall is provided on a position shifted from a center axis of a transverse direction of the fuel tank.

3. The vehicle fuel tank of claim 1, wherein the height of the suppressor wall is greater than 60% of the maximum height of the fuel tank.

4. The vehicle fuel tank of claim 1, wherein the suppressor wall is formed extending from the bottom portion.

5. The vehicle fuel tank of claim 1, wherein when the tank has portions of different heights from the bottom portion to the upper surface panel, and wherein the suppressor wall is formed on the bottom portion in an area where the tank portion is shorter in height.

6. The vehicle fuel tank of claim 1, wherein the at least one suppressor wall comprises a pair of suppressor walls comprising a left suppressor wall and a right suppressor wall.

* * * * *